United States Patent [19]
Johnson

[11] 4,361,223
[45] Nov. 30, 1982

[54] MATERIAL HANDLING APPARATUS

[75] Inventor: Donald O. Johnson, Matawan, N.J.

[73] Assignee: American Can Company, Greenwich, Conn.

[21] Appl. No.: 211,561

[22] Filed: Dec. 1, 1980

[51] Int. Cl.³ .............................................. B65G 25/00
[52] U.S. Cl. .................................... 198/751; 198/777; 414/748
[58] Field of Search .............. 198/459, 460, 474, 492, 198/718, 744, 751, 774, 777; 414/748

[56] References Cited

U.S. PATENT DOCUMENTS

| | | | |
|---|---|---|---|
| 2,948,386 | 8/1960 | Kay et al. | 198/777 |
| 3,270,864 | 9/1966 | Kay | 198/777 |
| 3,592,335 | 7/1971 | Meyer | 198/774 |
| 3,623,600 | 11/1971 | Dell | 198/774 |
| 3,662,876 | 5/1972 | Hollis | 198/751 |
| 3,729,086 | 4/1973 | Phillips et al. | 198/777 |
| 4,212,584 | 7/1980 | Johnson | 414/748 |

FOREIGN PATENT DOCUMENTS 2158142  5/1973  Fed. Rep. of Germany ...... 198/751

*Primary Examiner*—Joseph E. Valenza
*Attorney, Agent, or Firm*—Harry W. Hargis, III

[57] ABSTRACT

A conveyor for moving uniformly spaced-apart cylindrical articles transversely of their polar axes comprises a pair of parallel sawtooth rails, paired lifting and lowering levers on common pivots disposed along the rails in correspondence with each toothed portion of a rail, and cams for sequentially pivoting the lifting levers. The paired sawtooth elements include a stop surface and an inclined surface extending downwardly therefrom in the direction of article movement. The lowering lever is resiliently pivoted to an upper position independently of the lifting lever, and is downwardly pivotable by an article as it rolls down an inclined surface. Pivotation of the lowering lever to upper position permits the lifting lever gravitationally to pivot below an inclined surface. Pivotation of the lowering lever downwardly causes it to engage the lifting lever and maintain an article stop surface thereof above the inclined surface in a position upstream of the preceding sawtooth stop surface, and to which position the lifting lever also is pivotable from its lower position by a cam to lift an article over a corresponding sawtooth stop surface to cause it to roll down the succeeding inclined surface.

The paired lifting and lowering levers and the corresponding sawtooth elements are so cooperatively disposed as to define a series of article receiving stations accommodating, upon removal of an article, controlled, sequential movements of preceding ones of the articles along the rails, as the lifting levers and the lowering levers are sequentially pivoted.

12 Claims, 4 Drawing Figures

MATERIAL HANDLING APPARATUS

BACKGROUND OF THE INVENTION

This invention relates to material handling apparatus, and, while of broader applicability, is especially directed to an improved conveyor for moving generally cylindrical articles along a travel path, for example, between a pair of work stations.

Exemplary articles are crankshafts that weigh in the neighborhood of 500 lbs., and which must be moved, individually, in the course of their manufacture between work stations for performing various machine operations thereon. It has been found convenient to roll such articles, transversely of their polar axes and in mutually equally spaced relationship, on a track defined by parallel rails that supportingly engage a pair of their main bearing surfaces. Due to the massiveness of each such article, both their bearing surfaces and the rails are susceptible of damage arising from impact as the articles are rolled, typically in sequential increments, along the track; this same impact tends to noisy operation of the apparatus. It has also been found convenient to provide for selective accumulation, or storage, and movement of the articles.

The prior art teaches apparatuses for sequentially moving mutually equally spaced cylindrical articles along substantially horizontal rails, but not all have achieved impact free transfer of relatively massive articles, while affording accumulation and selective access thereto along the line of transfer.

It is a general objective of the present invention to provide an improved horizontal conveyor that affords sequential, impact free transport of generally cylindrical articles.

It is a further objective of the invention to provide an improved conveyor and accumulating means for somewhat massive, generally cylindrical articles.

SUMMARY OF THE INVENTION

In achievement of the foregoing as well as other general objectives, the invention contemplates an improved material handling apparatus for moving generally cylindrical articles transversely of their polar axes along a travel path, comprising: means defining a track extending along said travel path and including a series of upwardly extending article stop surfaces interspersed with inclined surfaces extending downwardly from a stop surface to the base of the successive stop surface in the direction of travel of said articles; a series of article lifting levers spaced along said track in correspondence with said series of stop surfaces and said inclined surfaces, each said lifting lever mounted for pivotation about an axis extending transversely of said travel path, and having its center of gravity to the side thereof opposite the recited direction of travel, each said lifting lever including an article lifting surface and an article stop surface movable, upon pivotation thereof to an upper position, into positions ahead of the corresponding one of said article stop surfaces on said track and above the corresponding inclined surface, and, upon pivotation thereof to lower retracted position, into positions below said inclined surface; a series of article lowering levers pivotal about said axis of each said lifting lever and positioned to overlap the next successive lifting lever in the direction of travel and in the region of its lifting and stop surfaces, each said lowering lever having an upwardly facing lowering surface movable between an extended position in which it is inclined upwardly above a corresponding one of said inclined surfaces, and a retracted position in which at least a portion thereof is below the level of one of said inclined surfaces; each said lowering lever including an abutment engageable with an abutment provided on its corresponding lifting lever upon movement of said lowering lever to retracted position, responsive to presence of an article on the corresponding ones of said inclined surfaces, whereby said lifting lever is held in its extended position; means resiliently urging said lowering lever to its extended position; and drive means operative alternately to move said lifting levers to the recited extended positions thereof, to lift an article over said stop surfaces, and to accomodate gravitational movement of said lifting levers to the recited retracted positions thereof, and permit an article to roll along an inclined surface and engage a stop surface.

The manner in which the foregoing as well as other general objectives and advantages may best be achieved will be more fully understood from a consideration of the following description, taken in light of the accompanying drawings.

DESCRIPTION OF THE PREFERRED EMBODIMENT

Figure 1:
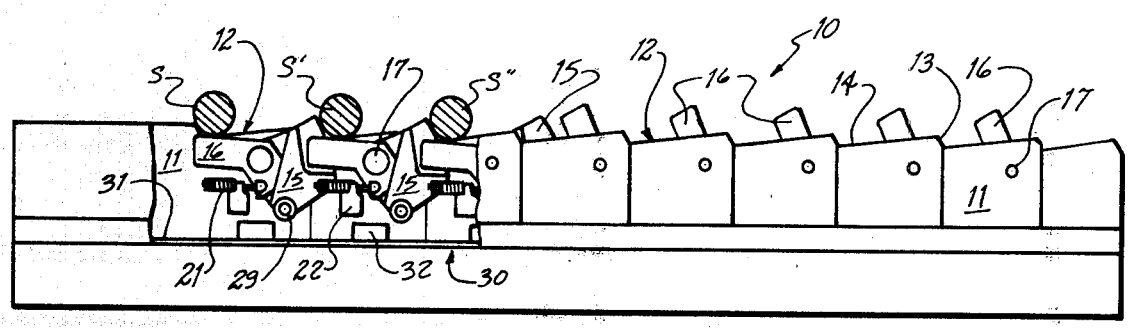
FIG. 1 is a fragmented elevational showing of material handling apparatus embodying the invention.

With more detailed reference to the drawings, there is seen in FIG. 1 material handling apparatus comprising a conveyor designated generally by the numeral 10, and including a pair of parallel rails 11 that extend along a travel path and have upwardly presented sawtooth surfaces defined by paired, serially arranged tooth portions 12. Each tooth portion 12 comprises an abutment or stop surface 13 and an inclined surface 14 extending downwardly therefrom in the direction of movement of articles to be described in what follows, and only three of which are shown at S, S' and S" for convenience of illustration.

A pair of levers 15 and 16 are mounted on each of pivots 17 provided on the rails 11, below inclined surface 14 of each sawtooth portion 12, and, for reasons to be more fully understood from a detailed consideration of FIGS. 2, 3 and 4, lever 15 is termed an article lifting lever and lever 16 is termed an article lowering lever.

As is seen in the left hand portion of FIG. 3, lifting lever 15 is freely pivotable, gravitationally, from its extended position in FIG. 2 to a right-hand rotational retracted position, in which an article abutment surface 18 and an article lifting surface 19 thereon drop below the inclined surface 14 of sawtooth 12. Also as is seen in FIG. 3, lowering lever 16 is pivotable from its retracted position in FIG. 2, in which at least a portion of its lowering surface 20 is below the level of inclined surface 14, to a right hand rotational extended position, in which the lowering surface 20 thereon is moved angularly above a portion of inclined surface 14. In the retracted position of lever, a distal portion thereof overlaps a successive lowering lever, and a corresponding portion of lowering surface 20 slopes upwardly above inclined surface 14 of the track. Right-hand pivotation of lever 16 is effected by means of a compression spring 21 reacting between an apertured bracket 22 on a rail 11 and a flange 23 on the end of a rod 24 extending with clearance through the aperture in bracket 22, and pivotably connected by a pin 25 to a downwardly projecting leg portion 26 of lever 16. Depending leg portion 26 of lever 16 overlaps a portion of lever 15 and includes an abutment 27 positioned and adapted releasably to engage a corresponding abutment 28 on lever 15, both of which abutments 27 and 28 are below pivot 17. Also below pivot 17 on lever 15 is a roller 29, the rotational axis of which is parallel to the axis of pivot 17.

Further to the construction of levers 15 and 16, each conveniently may be formed from flat stock of suitable material including recessed portions, such as may be formed by machining, in the regions of overlap. The paired levers accordingly are pivotable in substantially the same vertical planes, and abutments 27 and 28 comprise confronting faces that extend transversely of that plane, preferably perpendicular to the plane.

Apparatus 10 further includes a drawbar assembly 30 comprising a pair of drawbars 31 (one shown) disposed below and parallel to rails 11, and each including a plurality of cams 32 on upper surfaces thereof and serially disposed in linear spaced relation thereon, each below a roller 29. Drawbar assembly 30 is reciprocably movable linearly so that cams 32 move back and forth beneath but do not engage rollers 29 when the conveyor is in its fully loaded, idling mode as will be described, and as is illustrated in FIGS. 1 and 2. Drawbar assembly 30 preferably is driven from a single source, for example by a driving source such as is disclosed in U.S. Pat. No. 4,212,584.

Figure 2:
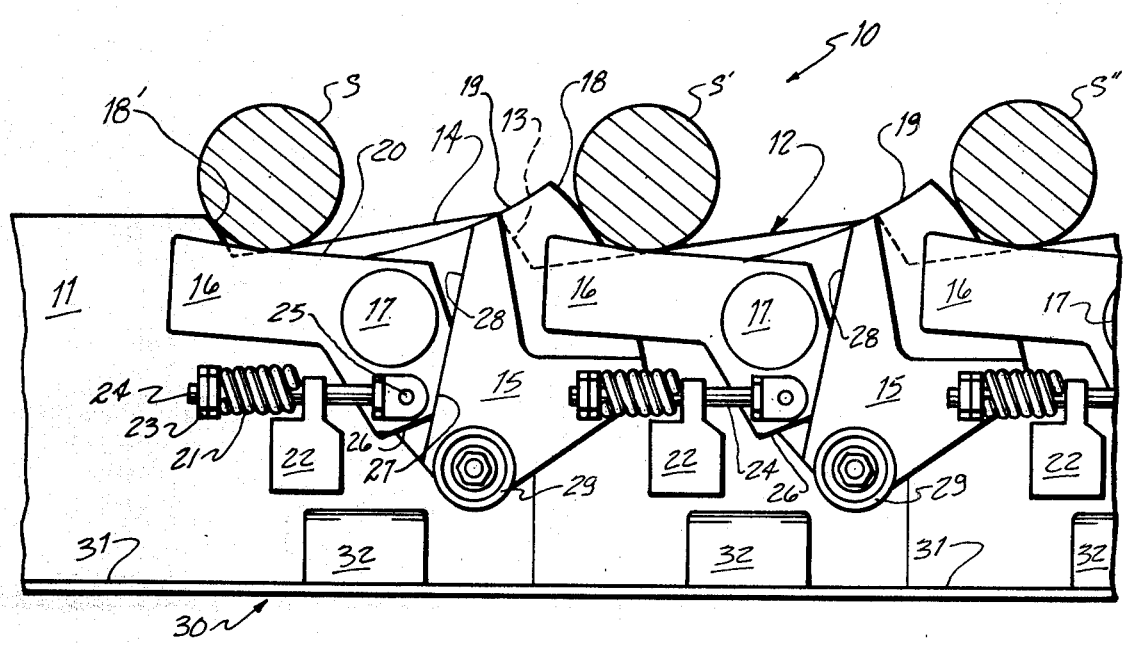
FIGS. 2, 3 and 4 are elevational showings, partly in section, of a left-hand portion of the apparatus seen in FIG. 1.
Figure 3:
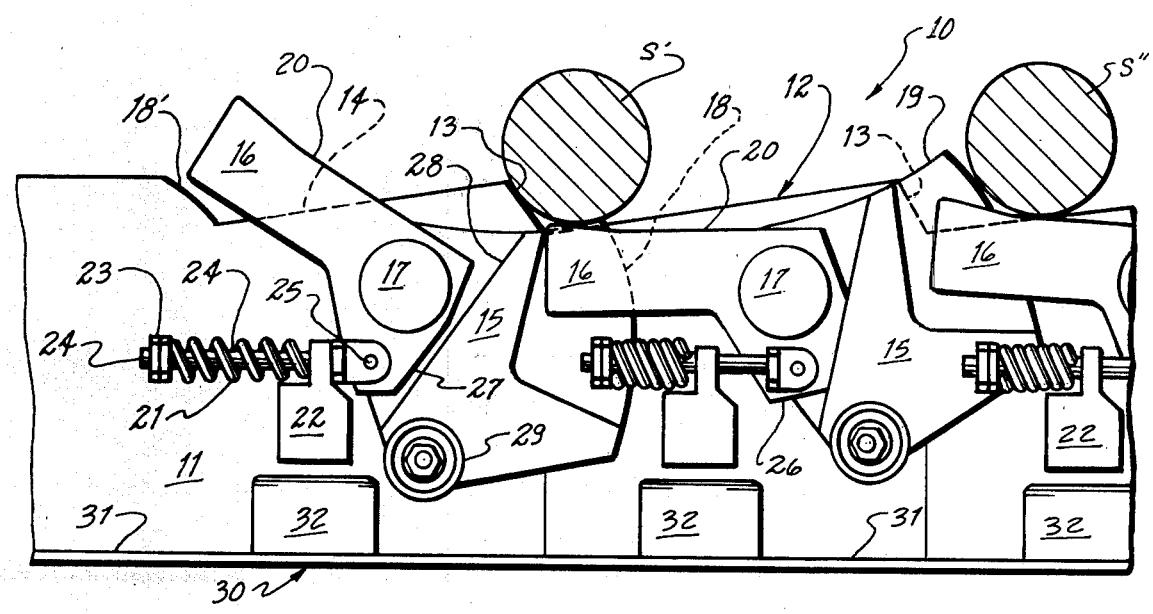

In the event one of articles S, S', S" is removed, for example, the left-hand article S shown in FIGS. 1 and 2, surface 20 of lowering lever 16 will be disengaged, releasing the lever, and, as is seen in FIG. 3, left hand lever 16 will be pivoted upwardly to its extended position, under action of compression spring 21. Pivotation of lever 16 releases its abutment 27 from abutment 28 on lifting lever 15, whereupon lever 15 is free to pivot, by virtue of the left hand position of cam 32, gravitationally to retracted position, lowering the article lifting surface 19 and the article stop surface 18 below both article stop surface 13 and inclined surface 14 of a rail 11. Still with reference to FIG. 3, this permits the next preceding article S' to roll down inclined surface 14, while cushioned by its engagement with the distal portion of lowering surface 20 of corresponding lever 16 as it is urged slightly beyond retracted position, further compressing spring 21, until the article engages and is stopped by stop surface 13, in which position the article is also above lifting face 19 of lever 15.

Figure 4:
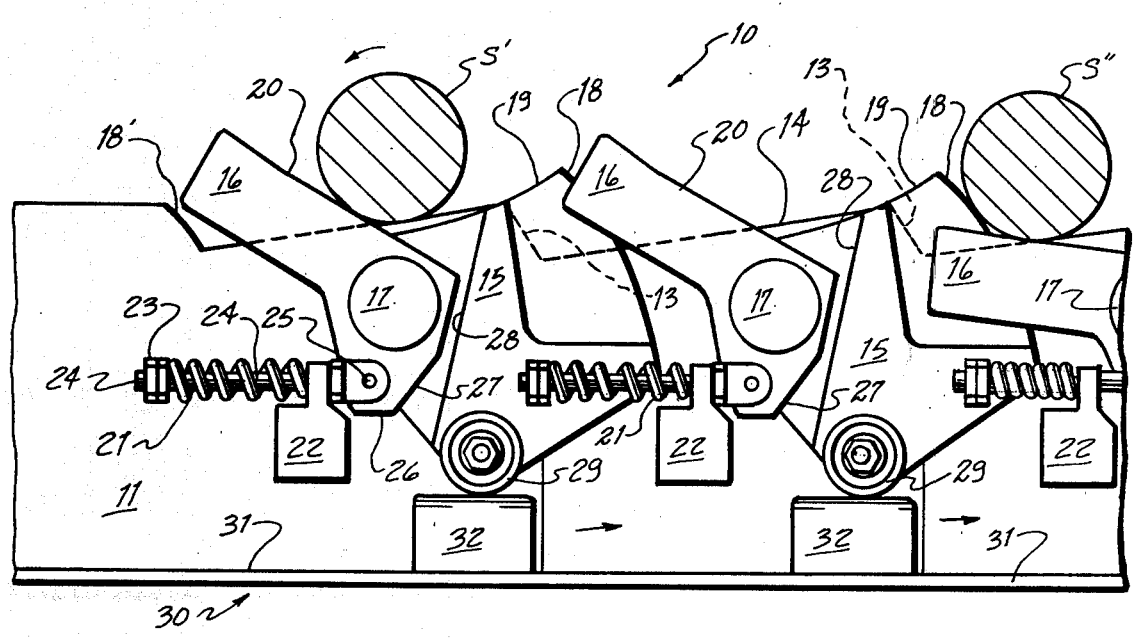

While article S' is positioned as seen in FIG. 3, cam 32 is moved by drawbar 31 to the right, as is seen in FIG. 4, to engage roller 29 and pivot lever 15 and its lifting face 19 upwardly to extended position, thereby lifting article S' over stop surface 13. Article S' then rolls down inclined surface 14 to engage lowering lever 16, as is seen in FIG. 4, and rotate it downwardly to its retracted position until such time article S' engages and is stopped by fixed stop surface 18', the left hand portion of FIG. 4 reverting to the showing of the left hand portion of FIG. 2. This same pivotation of lifting lever 15 by the article S' causes its abutment 27 again to engage abutment 28, pivoting lever 15 upwardly to extended position, and holding roller 29 from the influence of cam 32.

Further to FIG. 4, when article S' is lifted by lifting face 19, it releases a corresponding lowering lever 16, i.e., the center lever 16, which is then pivoted upwardly to extended position as shown, by its spring 21. This moves abutment 27 away from abutment 28 of the center lifting lever 15, but that lifting lever remains in place, due to engagement of roller 29 of the center lever 15 by cam 32, and holds article S" in place. The drawbar 31 is then moved to the left, releasing cam 32 from roller 29, whereupon center lever 15 pivots downwardly to its retracted position and releases article S". Release of article S" permits it to roll down incline 14 until it is stopped by stop surface 13, in the manner described in connection with FIG. 3. At this position, a lever 16 is held down in its retracted position by article S", and the article is above a lifting face 19. The drawbar 31 is then again moved to the right, moving cam 32 to engage roller 29 and pivot lever 15 upwardly to extended position lifting article S" over stop surface 13, whereupon it rolls down incline 14 to occupy the space formerly held by article S'.

In the event all stations are filled with articles at the outset, removal of any one article will initiate successive cyclic operation of the conveyor as described, until such time all vacant stations between articles are filled. Since articles are lifted over a stop surface 13 one at a time, power requirements for driving the drawbar advantageously are minimized.

It will be appreciated from the foregoing description that the invention affords improved material handling apparatus operative to achieve selective accumulation and impact-free transfer of relatively massive, generally cylindrical articles.

While a preferred embodiment of the invention has been illustrated and described, it will be understood that changes in form and details may be resorted to without departing from the scope of the appended claims.

I claim:

1. A material handling apparatus for moving generally cylindrical articles transversely of their polar axes along a travel path, comprising:

means defining a track extending along said travel path and including a series of upwardly extending article stop surfaces interspersed with inclined surfaces extending downwardly from a stop surface to the base of the successive stop surface in the direction of travel of said articles;

a series of article lifting levers spaced along said track in correspondence with said series of stop surfaces and said inclined surfaces, each said lifting lever mounted for pivotation about an axis extending transversely of said travel path, and having its center of gravity to the side thereof opposite the recited direction of travel of said articles, each said lifting lever including an article stop surface and an article lifting surface movable, upon pivotation thereof to an upper extended position, into positions ahead of the corresponding one of said article stop surfaces on said track and above the corresponding inclined surface, and, upon pivotation thereof to a lower retracted position, into positions below said inclined surface;

a series of article lowering levers pivotable about said first axis of each said lifting lever and positioned to overlap the next successive lifting lever in the direction of travel and in the region of its lifting and stop surfaces, each said lowering lever having an upwardly facing lowering surface movable between an extended position in which it is inclined upwardly above a corresponding one of said inclined surfaces, and a retracted position in which at least a portion thereof is beneath the level of one of said inclined surfaces;

each said lowering lever including an abutment engageable with an abutment provided on its corresponding lifting lever upon movement of said lowering lever to retracted position, responsive to presence of an article on the corresponding inclined surfaces, whereby said lifting lever is held in its extended position;

means resiliently urging said lowering lever to said extended position; and drive means operative to engage and move one of said lifting levers from its recited retracted position to its recited extended position, to lift an article over said stop surfaces, and to disengage and accommodate gravitational movement thereof to its recited retracted position, and permit an article to roll along an inclined surface and engage a lifting lever's stop surface.

2. Apparatus of claim 1, wherein said drive means comprises a single source, and cam and cam follower means coupling said source with said lifting lever.

3. Apparatus of claim 2, wherein said drive means comprises drawbar means driven by said single source and on which said cam means are disposed, and cam follower means on each said lifting lever engageable with and disengageable from said cam means.

4. Apparatus of claim 1, 2, or 3, wherein said means defining a track comprises a pair of rails of substantially parallel extent in which said stop surfaces and said inclined surfaces are formed, and pairs of lifting and lowering levers on mutually opposed regions of said rails.

5. Apparatus of claim 1, 2, or 3, wherein said lowering surface of said lowering lever includes a distal portion overlapping a successive one of said lifting levers, said distal portion sloping upwardly above said inclined surface of said track when said lowering lever is in said retracted position, said article engaging said sloping portion as it is released by said lifting lever's stop surface and rolls against said track's stop surface, further to pivot said lowering lever against said means for resiliently urging said lowering lever, whereby impact of said article against said track's stop surface is minimized.

6. Apparatus of claim 1, 2, or 3, wherein said abutments on each said lowering lever and each said lifting lever comprise flat surfaces extending transversely of the plane of rotation of said levers.

7. In a material handling apparatus for moving generally cylindrical articles transversely of their polar axes along a travel path, including means defining a track extending along said travel path, a series of upwardly extending article stop surfaces interspersed with inclined surfaces extending downwardly from a stop surface to the base of the successive stop surface in the direction of travel of said articles, a series of lifting levers spaced along said track in correspondence with said series of stop surfaces and said inclined surfaces, each said lifting lever mounted for pivotation about an axis extending transversely of said travel path and having its center of gravity to the side of said axis opposite the recited direction of travel of said articles, each said lifting lever including a lifting surface and a stop surface movable, upon pivotation thereof to an upper article lifting position, into a position ahead of the corresponding one of said stop surfaces on said track and above the corresponding inclined surface, the improvement comprising:

a series of lowering levers pivotal about said axis of each said lifting lever and positioned to overlap the next successive lifting lever in the direction of travel;

each said lowering lever having an upwardly facing surface movable between an extended position in which it is inclined upwardly above a corresponding one of said inclined surfaces, and a retracted position in which at least a portion thereof is below the level of one of said inclined surfaces;

an abutment on each said lowering lever engageable with an abutment provided on its corresponding lifting lever upon movement of said lowering lever to retracted position, whereby said lifting lever is held in its extended position;

means resiliently urging said lowering lever to said extended position; and drive means operative to engage and move said lifting levers, to the recited extended positions thereof and to disengage and accommodate gravitational movement thereof to the recited rest positions thereof, said lifting lever being operative to engage its lifting surface with an article and lift it over said article stop surface on said track for travel down said inclined surface, whereby the article engages said resiliently urged lowering lever and moves it to retracted position prior to engaging and being stopped by the stop surface of the successive lifting lever.

8. Apparatus of claim 7, wherein said drive means comprises a single source, and cam and cam follower means coupling said source with said lifting lever.

9. Apparatus of claim 7, wherein said drive means comprises drawbar means driven by said single source and on which said cam means are disposed, and cam follower means on each said lifting lever engageable with and disengageable from said cam means.

10. Apparatus of claim 7, 8, or 9, wherein said means defining a track comprises a pair of rails of substantially parallel extent in which said stop surfaces and said inclined surfaces are formed, and pairs of lifting and lowering levers on mutually opposed regions of said rails.

11. Apparatus of claim 7, 8, or 9, wherein said lowering surface of said lowering lever includes a distal portion overlapping a successive one of said lifting levers, said distal portion sloping upwardly above said inclined surface of said track when said lowering lever is in said retracted position, said article engaging said sloping portion as it is released by said lifting lever's stop surface and rolls against said track's stop surface further to pivot said lowering lever against said means for resiliently urging said lowering lever, whereby impact of said article against said track's stop surface is minimized.

12. Apparatus of claim 7, 8, or 9, wherein said abutments on each said lowering lever and each said lifting lever comprise flat surfaces extending transversely of the plane of rotation of said levers.

* * * * *